United States Patent Office 2,905,591
Patented Sept. 22, 1959

2,905,591

AIR ODOR CONTROL LIQUIDS

Jack J. Bulloff, Dayton, Ohio, assignor to Interstate Sanitation Company, Inc., Cincinnati, Ohio, a corporation of Ohio No Drawing. Application August 5, 1955
Serial No. 526,772

1 Claim. (Cl. 167—94)

This invention relates to the control of air odors and to liquids capable of deodoring and/or re-odoring air without undue deterioration of the liquid in use.

Fluids sufficiently active to deodor air chemically acquire odor both by oxidation and by absorbing the bad smell. This renders their use in deodoring and reodoring air obnoxious long before their ability to remove smells is exhausted.

Many fluids have a tendency to acquire odor from their deodorant activities but are subject to chemical action from the oxygen of the air which tends to alter them in undesirable ways and to render them unsuitable for practical use as air odor controlling agents.

Highly volatile fluids are not suitable for use as air odor control materials because they evaporate too readily and dispensers containing them run dry rapidly. On the other hand, relatively non-volatile fluids evaporate more slowly than is required, have very little deodorizing effect in the vapor phase, and have little or no re-odoring effect or "presence."

Up to the present time, there have not been available air odor controlling liquids that satisfy all of the requirements for economical, practical use.

An object of this invention is to provide new air odor control liquids for use in inverted well and other types of dispensers from which the liquids evaporate into the air, which liquids do not become stale in odor nor deposit gum or other detritus necessitating frequent servicing on prolonged use of the dispenser.

This and other objects of the invention which will become apparent hereinafter are accomplished by providing liquid compositions containing certain terpenes and which do not form any appreciable amount of gum or undergo staling of the odor on evaporation. Optionally, the liquids may comprise added deodorants and/or re-odorants for insuring odor constancy in use.

It is found that fluids having a boiling point in the range 330° F. to 380° F. have the required volatility for evaporation at the temperatures (such as 60° F. to 100° F.) normally encountered in use.

It is also found that fluids having labile chemical groups or bonds capable of both odoring the fluids and of providing a chemical potential for combining with active, malodorous molecules present in smells in the air have the desired chemical reactivity for the present purposes.

Thus, compounds containing the carbon-carbon double bond are suitable when the double bond is chemically labile. However, not all compounds containing the carbon-carbon double bond meet the requirements for the present purposes. Thus, if the lability of the bond is such that it results in an objectionable odor, the compounds containing it are unsatisfactory. In compounds in which the lability of the double bond results in oxidative deterioration of the compound before it can exert the deodorant effect, on the other hand, the lability is excessive and the compound is not acceptable for use in the present air odor controlling compositions, while compounds containing a carbon-carbon double bond which is insufficiently chemically labile may be re-odorants under some conditions but are not effective deodorants. Therefore, in order for a particular liquid to meet the present requirements, the lability of the carbon-carbon double bond must be balanced so that the compound exhibits controlled activity and evaporates at the desired rate without gumming or staling of the odor on exposure to air.

I have found that certain members of the group of hydrocarbons known as terpenes satisfy the requirements with respect to chemical lability and volatility at the temperatures normally met in use. In admixture with anti-oxidants or organic solvents such as inert hydrocarbons having a vapor pressure similar to that of the terpene, the terpenes provide stable compositions which are new and highly satisfactory air odor control liquids.

The monocyclic terpenes are preferred over the open chain and bicyclic terpenes. Even the monocyclic terpenes show a decided specificity for my purposes. Thus, the menthanes are inactive, the menthenes are only slightly active, the benzenoid menthatrienes are relatively inactive and the non-benzenoid menthatrienes are objectionably over-active. Of the monocyclic terpenes, the menthadienes are found to possess, to the desired extent, the balanced lability required for satisfactory control of air odors by evaporation from suitable containers.

The individual ortho-, meta-, and para-menthadienes and their optically active stereoisomers (and non-optically active racemers thereof) vary somewhat in their effectiveness. Thus, those containing conjugated double bonds, or which contain double bonds externally to the 6-carbon ring, may have more tendency, on evaporation, to form gums or to stale in air than do those having non-conjugated double bonds only one of which, at most, is a non-ring double bond.

Therefore, after exhaustive, extended research and experimentation, I have provided new air odor control liquid compositions comprising the menthadienes, and preferably those containing non-conjugated double bonds.

The menthadienes, or commercial products or extracts containing them in high concentration, are stabilized for retarding gum formation and odor staling of the odor thereof in use.

The stabilizing agent may be an anti-oxidant in an amount of 0.001% to 5.0%, preferably 0.0002% to 0.3%, by weight. In commercial extracts containing 40% to 95% of the para-menthadienes, anti-oxidants may be present naturally. Such extracts may be used without the addition of further anti-oxidant, or an anti-oxidant may be added to a total quantity preferably not higher than 5%.

All of the menthadienes can be stabilized by the incorporation of anti-oxidants compatible therewith to form substantially uniform or homogeneous mixtures. However, the less labile the menthadiene the less the amount of anti-oxidant required and, therefore, when solid residues from the anti-oxidant are to be avoided, the less labile menthadienes are preferred and selected.

The para-, meta-, and ortho-menthadienes may all be used as the terpene component of the stabilized air odor control liquid. However, the commercial or technical-grade terpenes which contain the highest concentrations of menthadienes and which are preferred starting materials for reasons of economy, being derived as by-products of processes utilizing natural products, contain only para-menthadienes. Therefore, the latter will be used, normally, in practicing the invention because of the ready availability of large amounts of the commercial materials containing them. For instance, one suitable source of the menthadienes is citrus oil. A citrus oil product known as "Menthadiene" is 95% d-limonene and 5% sweet oil having some residual anti-oxidant activity. When as little as 0.002% of nor-dihydroguaiaretic acid, or as little as 0.02% of butylhydroxyanisole, is added to the "Menthadiene," the latter is stabilized against oxygenic oxidation and can be used as an effective de-odorant for 100 days in evaporating devices as described in U.S. Patent Nos. 2,166,969 and 2,246,008, without odor staling or gum formation. Additionally, the citrus odors present in "Menthadiene" are stabilized by the anti-oxidants mentioned and function as an auxiliary de-odorant (d-limonene has only a weak lemon odor when pure) of marked "presence" and of stable odor.

The citrus oil containing a high concentration of d-limonene is one commercially available source of the menthadiene.

Another source of menthadienes are the coniferous wood extracts used in the turpentine and wood-pulp industries. The menthadiene fractions may be extracted from the wood by distillation, steam-distillation, destructive distillation, or by other extraction methods, and may be extracted from the wood and then isomerized. However obtained, the fractions, during the course of extraction or of extraction and isomerization, undergo physical and chemical stresses which render them optically inactive, that is the naturally occurring d or l stereoisomers are converted to optically inactive d,l-racemers. Thus, extracted oils contain not d- or l-limonene, but d,l-limonene or dipentene.

The oils are not pure. They may contain as many as 15 different terpenes which cannot be separated economically. Also, the severe treatments to which they are subjected during preparation results in breakdown of the more stable natural terpenes and isomerization of the more labile terpenes, and fragments of labile types different than the naturally occurring terpenes may have been introduced. Thus, commercial dipentenes containing 40–60% d,l-limonene (dipentene) may also contain 10–30% of more labile terpenes such as terpinolenes and terpinenes. Since these more labile terpenes tend to more readily form gums and to quickly acquire an overwhelmingly bad odor (odor staling) on exposure to air, the presence of the more labile terpenes in such relatively large amounts may be a disadvantage of the wood extracts.

The commercial dipentene, that is the menthadiene as it occurs in the coniferous wood extracts, can be modified in several ways to adapt it to use as an air odor control liquid according to the invention. Thus, it can be stabilized by the addition of an anti-oxidant. However, comparatively large amounts of the anti-oxidant may be needed to overcome the tendency of the terpinolenes and terpinenes occurring with the dipentene (d,l-limonene) in the extract. The higher proportions (above 3% and up to 5%) may not be objectionable when the anti-oxidant is a liquid. But if solid anti-oxidants are to be used, enough residue may accumulate on evaporation of the mass to plug the feed from the inverted well or to foul the cup in which the air odor control fluid is contained. Solid anti-oxidants should be avoided in that case, or the amount required reduced by increasing the stability of the commercial dipentene in some other way.

One way of modifying the commercial dipentene so that the amount of anti-oxidant required is reduced is to dilute the dipentene (wood extract) with an inert solvent having a vapor pressure similar to that of the dipentene. Soltrol 130 a completely odorless petroleum fraction marketed by Phillips Petroleum Company, and Shell Sol 72 a petroleum fraction marketed by Shell Development Company are examples of inert hydrocarbon solvents that may be used. The inert solvent of similar vapor pressure may be used in an amount of 5% to 20%. Solid anti-oxidants are then effective to retard gumming and odor staling in amounts which do not deposit objectionable residues to plug the feed or foul the cup.

It is also within the purview of the invention to fortify commercial or crude extracts containing 40% to 95% of the dipentene with purer menthadienes such as d- or l-limonene or with products containing the limonenes in high concentrations such as "Menthadiene" containing 95% d-limonene. By mixing 5% to 10% of pure d-limonene, l-limonene or dipentene with a coniferous wood extract containing 50% of dipentene, the proportion of terpineols and terpinenes present is reduced and small amounts of the anti-oxidant (0.001% to 3.0% or less) are effective to retard or prevent gumming and staling of the odor during evaporation of the mixture.

A further embodiment of the invention contemplates a three-component mixture comprising commercial dipentene, a source of d- or l-limonene containing 50–95% of the optically active isomer, and an inert hydrocarbon solvent of similar vapor pressure. In these mixtures, the commercial dipentene, source of d or l-limonene and hydrocarbon solvent may be mixed in equal parts by weight. Or either or both of the d-, or l-limonene source may be present in amounts between 5 and 20% by weight, the commercial dipentene constituting the remainder of the liquid.

Dilution of the commercial dipentene with the pure d- or l-limonene or highly concentrated d- or l-limonene source (such as "Menthadiene") and the hydrocarbon solvent also has the effect of reducing the relative proportions of those substances present in wood extracts which tend to gum and stale the odor. This may thus be done while maintaining constant potency of air deodorant non-gumming material.

Stabilization of the liquid by small, even nominal, amounts (0.001% to 3%) of the anti-oxidants is then possible.

The three-component mixtures just described are economically important because the final stabilized air odor control liquid obtained may not be any more expensive than commercial dipentene and has all of the deodorant activity of the latter, little of its tendency to gum or stale or to resist stabilization by the anti-oxidant. Moreover, the fluid has a pleasant and controllable de-odorant effect.

The fluids of the invention may be dyed by including dyestuffs soluble therein.

The air odor control fluids derived from the citrus oils have an odor of the parent fruit, whereas fresh commercial dipentene has a weak, piney odor. When a non-citrus re-odorant is preferred, the dipentene may be used.

The stabilized citrus oil of high d-limonene concentration and the commercial dipentene may be further modified by adding thereto deodorants which "neutralize" the natural odor of the oils and wood extracts, and also any staleness of odor which may develop during evaporation.

Re-odorants or substances which mask odors may be mixed with the de-odored materials. Compositions that have been deodorized and then reodored or mixed with odor-masking substances have good covering properties and may be used for various perfumery purposes. When the compositions include perfume, essential or aromatic oils as re-odoring component and are to be used as perfumes or perfume bases, only the smaller amounts of anti-oxidant are needed to retard the gumming.

The de-odoring and re-odoring or masking substances may be any substances soluble or miscible with the citrus oil or wood extract in amounts between 5% and 20%. If the oil and/or wood extract is diluted with a hydrocarbon solvent as described herein, smaller amounts (2–10%) of both the deodorant and re-odorant or masking substance is required to impart the desired odor to the products. Such dilution also reduces the amount of anti-oxidant needed for stabilizing the products. Thus, when air is to be re-odored rather than de-odored, the limonene potency of the products may be reduced drastically without rendering the product unsuitable for use as a re-odoring agent.

The following examples are given to illustrate specific embodiments of the invention. It will be understood that these examples are not intended as limitative or restrictive of the scope of the invention.

*Example I*

An evaporating dispenser comprising a well and provided with a plastic cap evaporator was used. The well was filled with 24 oz. of "Menthadiene" (the product marketed by Florida Molasses Co. and consisting of 95% $d$-limonene and 5% of sweet orange oil components having residual anti-oxidant activity). After 70 days, when 50% of the well contents had fed into the plastic cap evaporator and evaporated into the air at normal prevailing temperature, the "Menthadiene" was unaltered in odor and clarity, and no gumming had occurred.

*Example II*

"Menthadiene" was mixed with 0.002–0.1% of nor-dihydroguaiaretic acid and placed in the well of an evaporator of the well type. A slight change in color (the natural orange color became fainter) on evaporation was the only identity index which was noticeably changed during the evaporation. Gumminess did not develop.

As stated, the preferred terpenes are the ortho-, meta- and para-menthadienes. These may be used in pure form but for reasons of economy are usually preferably used in the form of commercially available products having a 50% to 95% content of menthadiene either as the optically active $d$ or $l$ isomers, or in the racemic $d,l$ form. The pure menthadienes, the commercial products containing them, or mixtures of the commercial products with each other, for example mixtures of commercial dipentene and "Menthadiene," as well as mixtures of the commercial products with pure ortho-, meta-, or para-menthadiene may be mixed with solvents having the same vapor pressure, as disclosed herein, with or without, but usually with prior modification thereof with an anti-oxidant, and placed in a suitable container for evaporation.

The liquid deodorants and/or reodorants may be adapted to particular use by mixing or blending with appropriate materials. Thus, they may be adapted to use as mothicides by dissolving therein such mothproofing agents as ortho-, meta-, or para-dichlorobenzene, mixtures of para- and ortho-dichlorobenzene, or hexachloroethane as such or in synergistic admixture with one of the dichlorobenzenes mentioned. Amounts of the mothproofing agents between 5% and 10% are satisfactory.

Definite insecticide properties may be imparted to the air odor control fluids of the invention by dissolving an insecticide therein. For instance, "Thanite" (a substituted terpene marketed by Hercules Powder Company) may be dissolved in the fluid to obtain a product for general insecticide use. From 5 to 50% of the insecticide may be employed.

Citrus oils containing a high concentration of $d$-limonene and coniferous wood extracts containing dipentene have been disclosed as the source of the terpene component of the vaporizable liquid compositions. Other sources of the menthadienes, such as other plant extracts, containing at least 50% to 95% of methadiene of the desired chemical lability may be used.

It will be understood that various changes and modifications may be made in practicing the invention without departing from the spirit and scope thereof. Therefore, it is not intended to limit the invention except as defined in the appended claim.

What is claimed is:

An air odor control fluid vaporizable at ordinary temperatures and consisting essentially of menthadiene and composed of 95% $d$-limonene and 5% of sweet orange oil, and which is stabilized against oxidation by the addition thereto of 0.002% to 0.1% by weight of nor-dihydroguaiaretic acid.

References Cited in the file of this patent

UNITED STATES PATENTS

| | | |
|---|---|---|
| 1,816,811 | Hoffert | July 28, 1931 |
| 2,023,385 | Story | Dec. 3, 1935 |
| 2,324,347 | Anderson | July 13, 1943 |

FOREIGN PATENTS

| | | |
|---|---|---|
| 125,308 | Germany | 1901 |
| 425,309 | Great Britain | Mar. 7, 1935 |

OTHER REFERENCES

Lesser: Soap and Sanitary Chemicals, May 1947, pp. 131, 133, 135, 137 and 151; "Air Deodorizers."

Karrer: Organic Chemistry, 2nd ed., 1946, p. 654.